United States Patent
Little et al.

(10) Patent No.: US 8,702,058 B2
(45) Date of Patent: Apr. 22, 2014

(54) WEAR-RESISTANT VALVE FOR TRANSPORTING PARTICULATE MATTER AND METHOD OF MAKING

(75) Inventors: Austin Tyler Little, Chillicothe, OH (US); Clint M. Sowers, Ashville, OH (US); Tony F. Habib, Lancaster, OH (US); Billy G. Springer, Jr., Columbus, OH (US); Stephen J. Lukezich, Canal Winchester, OH (US)

(73) Assignee: Diamond Power International, Inc., Lancaster, OH (US)

( * ) Notice: Subject to any disclaimer, the term of this patent is extended or adjusted under 35 U.S.C. 154(b) by 830 days.

(21) Appl. No.: 12/768,133

(22) Filed: Apr. 27, 2010

(65) Prior Publication Data

US 2011/0259251 A1 Oct. 27, 2011

(51) Int. Cl.
*F16K 1/16* (2006.01)
*F16K 3/30* (2006.01)
*F16K 47/00* (2006.01)

(52) U.S. Cl.
USPC .......................... 251/301; 251/298; 251/367

(58) Field of Classification Search
USPC ......... 251/298, 301, 367, 366, 362, 363, 359, 251/326, 328, 329; 406/144
See application file for complete search history.

(56) References Cited

U.S. PATENT DOCUMENTS

| | | | |
|---|---|---|---|
| 3,437,384 A | 4/1969 | Bozich | |
| 4,137,935 A | 2/1979 | Snowdon | |
| 4,382,450 A * | 5/1983 | Tennick | 251/298 |
| 4,671,310 A * | 6/1987 | Henninger | 251/363 |
| 4,776,730 A | 10/1988 | Nearen et al. | |
| 5,154,397 A | 10/1992 | Thomas et al. | |
| 5,160,222 A | 11/1992 | Noland | |
| 5,775,237 A | 7/1998 | Reilly et al. | |
| 6,481,360 B1 | 11/2002 | Hume et al. | |
| 7,066,689 B2 * | 6/2006 | Maguire | 406/18 |
| 7,306,200 B2 | 12/2007 | Cochran | |

FOREIGN PATENT DOCUMENTS

| | | |
|---|---|---|
| DE | 1 550 139 | 7/1969 |
| DE | 34 14077 A1 | 10/1985 |
| EP | 0 035 854 | 9/1984 |
| EP | 1 950 154 | 7/2008 |

OTHER PUBLICATIONS

European Search Report—Sep. 1, 2011.
"Application of Fly Ash Removal and Disposal Technology—Opportunity of Significant Increase of Reliability, Profitability and Environmental Regulatory Compatibility of Coal Fired Power Plants," by M. Heeley and Y. Kolomiiets, Clyde Bergemann Technology, Doncaster, England, United Kingdom, Paper 621.311.22:504, 3 pages, prior to 2010.
Bulletin by United Conveyor Corporation for Replacement Fly Ash Intake for A-S-H* Systems "Tiger Valve" ™ Revised Jun. 6, 2002, 3 pages.

* cited by examiner

*Primary Examiner* — Kevin Lee
(74) *Attorney, Agent, or Firm* — Brinks Gilson & Lione

(57) ABSTRACT

The present disclosure provides a valve for controlling the flow of abrasive particles along a predetermined path from the outlet of a hopper to a conveying line in a particle collection or transportation system. The design of the valve reduces the occurrence of erosive wear resulting from contact with the flow of abrasive particles. A method of making the valve that enhances the hardness of localized areas in the valve that are subject to high wear conditions is also disclosed.

33 Claims, 10 Drawing Sheets

WEAR-RESISTANT VALVE FOR TRANSPORTING PARTICULATE MATTER AND METHOD OF MAKING

FIELD OF INVENTION

This disclosure relates generally to valves used in the transport of particulate matter. More specifically, this disclosure relates to a method of making a wear-resistant valve and to the use of such valve in controlling the flow of "dry" particles or particulate matter in a pneumatic collection or transportation system.

BACKGROUND OF INVENTION

Multiple industries, such as compounding and plastic composite processing, chemical and mineral processing, the food industry, and the pharmaceutical industry, among others, require the conveyance of small particulate matter from one location to another location in order to either incorporate such particles into a product or to remove particulate by-products and waste formed during the manufacturing process. The combustion of coal or similar fuels represents one example of a process that produces small by-product or waste particles (e.g., typically called fly ash) that can be removed from the site of combustion as part of an exhaust gas. The diameter of the small particles that flow in a particle collection or transportation system may range from about several millimeters to about 0.01 micrometers. One feature common to most particle collection or transport systems is that the particles should not be exhausted into the atmosphere because such a release will raise multiple environmental issues and concerns. Thus, various technologies, such as electrostatic precipitators and bag filters, are generally utilized to remove the small particles from the exhaust gas prior to the exhaust gas being released into the atmosphere.

The small particulate matter that will be moved via the transport system typically are collected in one or more hoppers or bins. The transfer of the particles from these bin(s) or hopper(s) to a desired location, such as a compounding vessel or a disposal unit, can be accomplished through the use of a particle collection or transportation system. Such a particle collection or transportation system will generate a pressure differential through the use of compressed air and/or vacuum to cause the small particles to flow from the hopper through a control valve and a conveying line to the desired location. Although this process may seem simple in nature, the movement of small particles can cause significant issues related to the erosive wear of the devices and equipment that are exposed to the flow of these particles.

A particle collection or transportation system is basically a pressure/vacuum line or conveying that is capable of causing a high differential pressure gradient in order to move large quantities of small, relatively abrasive particles. This high differential pressure gradient causes the small particles to flow at high velocities through the narrow gaps present in the control valve, thereby, eroding the valve assembly, reducing the efficiency of the valve, and shortening the effective lifetime expected for the valve. This problem becomes more evident in a valve that is used for the lateral loading of a main pressure/vacuum line. In this case, the lateral-style valve must turn the abrasive particles by an angle of about 90 degrees upon flowing from the hopper into the main pressure/vacuum line.

The abrasive particles can cause the erosion of multiple components within the lateral-style valve, including the body, the gate, and the seat. Such erosion may occur in a relatively short period of time, even on the order of a few weeks. The erosive wear of the valve components ultimately results in a reduced system capacity or excessive down-time to perform repairs, both of which lead to a loss in productivity. Thus, a problem exists in maintaining the efficiency of a valve assembly when it operates in an abrasive environment. Accordingly, there is a continual need for the development of lateral-style valves that exhibit reduced erosive wear and that will provide for high reliability and low maintenance of a system that uses such a valve.

SUMMARY OF INVENTION

The present disclosure provides a lateral-style valve for controlling the flow of abrasive particles along a predetermined path from the outlet of a hopper to a conveying line in a particle collection or transportation system. The valve reduces the occurrence of erosive wear resulting from contact with the flow of the abrasive particles. Such reduction in wear is accomplished by positioning the seat of the closure mechanism in the valve to be non-concentric and/or oversized in relation to the outlet of the valve body through which the ash particles flow. The location of the seat partially hides the seat from the predetermined path for the flow of abrasive particles, thereby, reducing the erosive wear incurred by the seat. In addition, the inner walls of the valve are angled such that the incident angle of impact from the flowing abrasive particles is relatively small, thereby, reducing the damage incurred upon impact. Finally, the width and length of the outlet orifice in the valve body is predetermined to reduce both the velocity of the abrasive particles and reduce the zone in which the particles accelerate as they flow through the valve. A reduction in the velocity of the abrasive particles slows the wear rate of the components present in the valve.

According to yet another aspect of the present disclosure, a method of making the valve body and gate housing that comprise two of the wear components in the valve is provided that further enhances the wear resistance of the valve. More specifically, the method enhances the formation of metal carbides in high wear areas in order to reduce the erosion in these areas by the flow of abrasive particles. This method incorporates the use of localized chilling of the core in a mold used in a metal casting process. The valve constructed according to the design and method of the present disclosure is found to exhibit substantial gains in wear resistance when compared to a conventional valve.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF INVENTION

Figure 1:
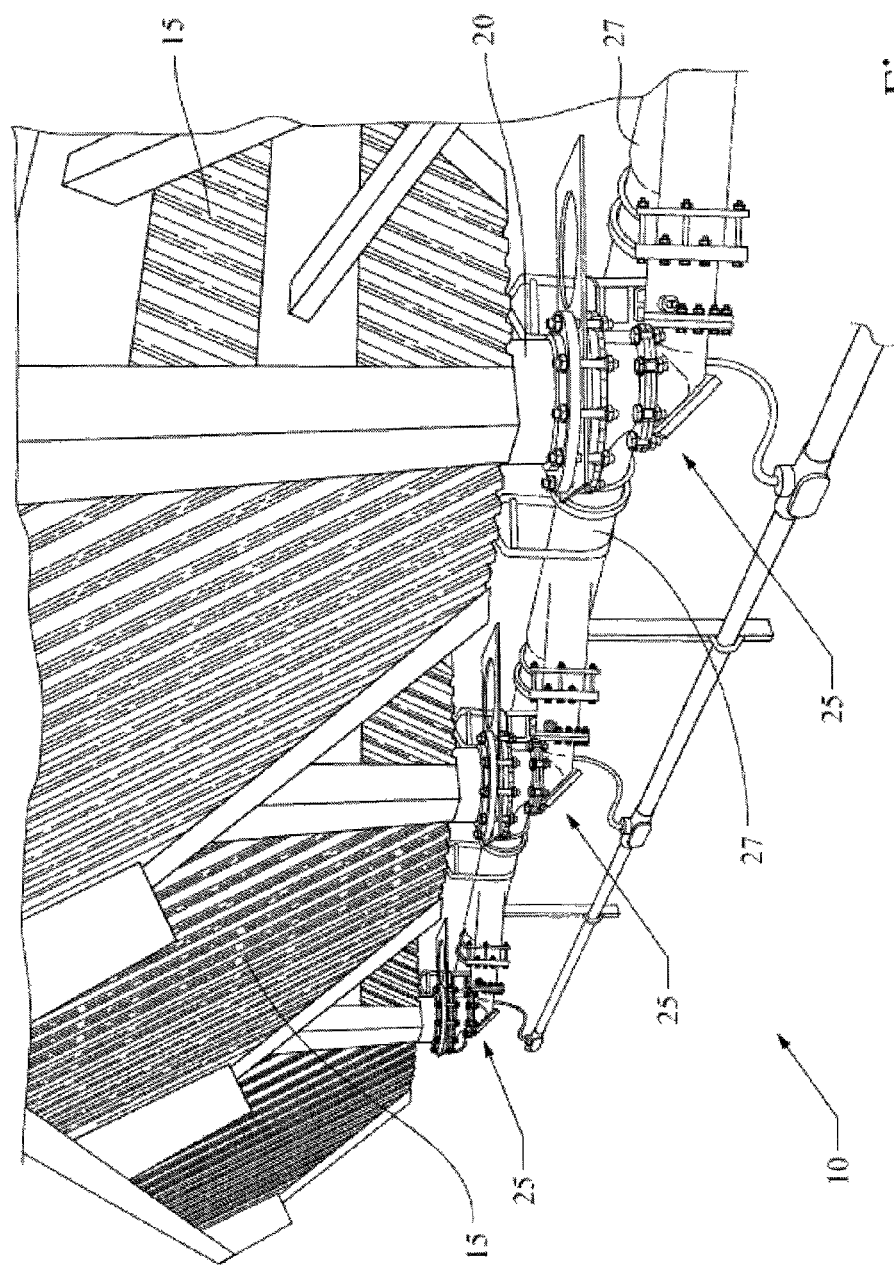
FIG. 1 is a perspective view of a fly ash transportation system constructed according to the teachings of the present disclosure.

The following description is merely exemplary in nature and is in no way intended to limit the present disclosure or its application or uses. For example, while the flow of fly ash particles through the valve and the use of the valve in a fly ash transportation system are described to illustrate the present disclosure, other types of abrasive particles and the use of the valve to control the flow of such abrasive particles in particle transport systems used in a variety of different industries, such as plastic composite compounding, chemical and mineral processing, food preparation and packaging, cement mixing, and pharmaceutical preparation, among others, are contemplated to be within the scope of the disclosure. The abrasive particles that may flow through such a valve may include, but not be limited to, fly ash, concrete/cement, aluminum oxide, calcium carbonate, ceramic dusts, clays, flour, foundry sand, magnesium oxide, metallic salts, silica, soda ash, talc, titanium dioxide, and zinc oxide, to name a few. It should be understood that throughout the description and drawings, corresponding reference numerals indicate like or corresponding parts and features.

Figure 2:
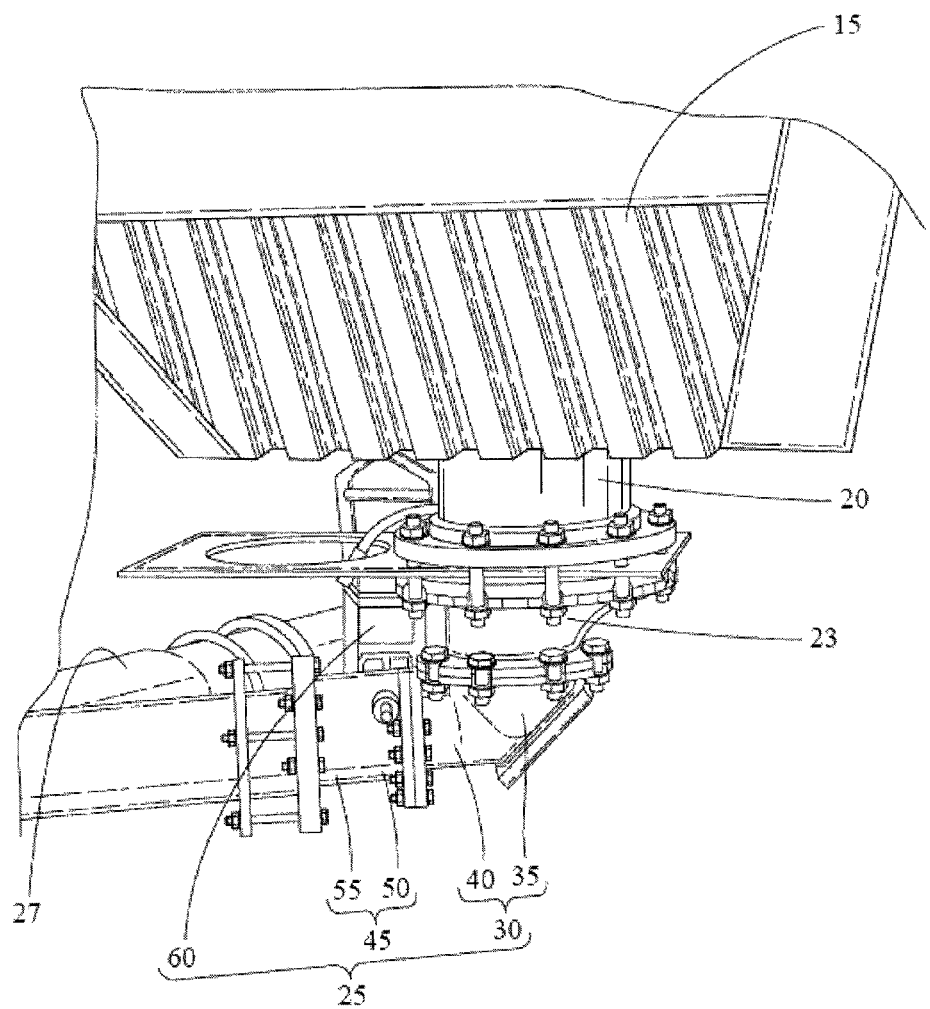
FIG. 2 is a perspective view of the valve assembly of FIG. 1.

The present disclosure generally provides a valve for controlling the flow of abrasive particles (e.g., ash, etc.) along a predetermined path from the outlet of a hopper to a conveying line in a particle (e.g., fly ash) collection or transportation system. Referring to FIGS. 1 and 2, a fly ash transportation system 10 according to the present disclosure includes at least one hopper 15 having an outlet 20 coupled to a valve assembly 25. Each valve assembly 25 is further coupled to a conveying line 27 or pipeline used for transporting the ash particles to a disposal unit. The valve is designed to reduce the occurrence of erosive wear resulting from contact with the flow of ash particles. The conveying line may comprise multiple connectors, such as T-type or Y-type connectors used to couple the valve assembly 25 into a single conveying line 27.

Figure 3:
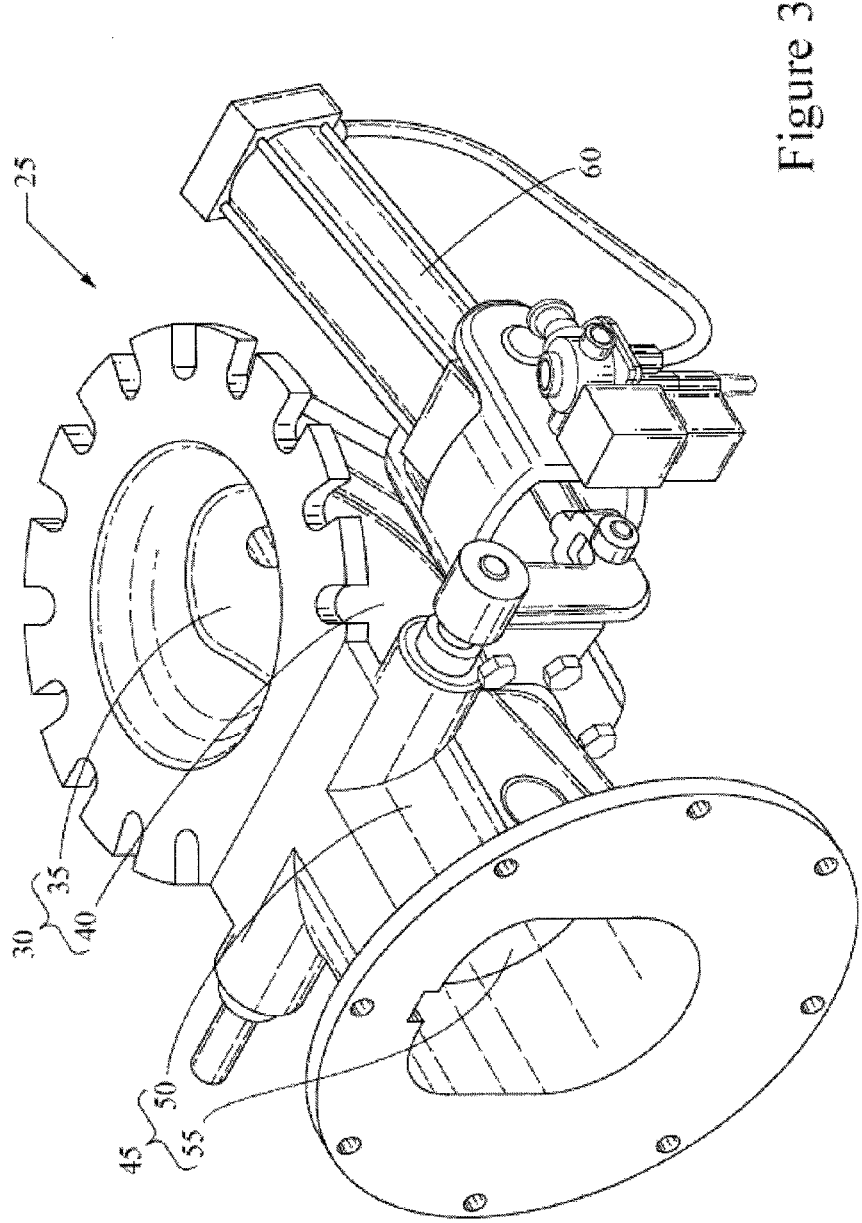
FIG. 3 is a perspective view of a valve assembly constructed according to the teachings of the present disclosure where the valve has been disconnected from the fly ash transportation system.

Referring to FIG. 2, the outlet of the hopper 20 may be sized such that a connecting tube is necessary to couple the outlet 20 to the valve assembly 25. As shown in FIGS. 2 and 3, the valve assembly 25 generally comprises a valve body 30 coupled to outlet 20 of the hopper 15 and a gate housing 45 coupled to the conveying line 27. The valve body 30 and gate housing 45 are also coupled together. The valve body 30 includes both an inlet section 35 and an outlet section 40. Similarly, the gate housing 45 also includes an entrance portion 50 and an exit portion 55. The valve assembly 25 further comprises an actuating means 60 to cause the valve to move between open and closed positions.

Referring now to FIGS. 2, 3, 4, and 5, the inlet section 35 and outlet section 40 of the valve body 30 are normal to one another and define a first passageway 65 through which the abrasive particles can flow. The outlet section 40 further defines an outlet section centerline where the abrasive particles are discharged from the first passageway 65. The inlet section 35 is adapted to be coupled to the outlet 20 of the hopper 15 as shown in FIG. 2. The first passageway 65 has an inner surface 70 curved such that an angle ($\alpha$) of at least 90 degrees is established between the centerline of the orifice established by the inlet section 35 (inlet section centerline) and the centerline of the orifice established by the outlet section 40 (outlet section centerline). The valve body 30 may also comprise a removable access cover 75 (see FIGS. 4 & 5). The access cover 75 has an inner surface curved to be substantially similar to or the same as the inner surface 70 of the valve body 30 defining the first passageway 65.

The entrance portion 50 and the exit portion 55 of the gate housing 45 are parallel to one another and define a second passageway 80 through which abrasive particles can flow. The exit portion 55 of the gate housing 45 is adapted to be coupled to the conveying line 27. The second passageway 80 is further defined by an inner wall 85 of the gate housing 45 at the lower portion of the passageway and is slanted such that an angle ($\beta$) is established between the plane of the inner wall 85 in the entrance portion 50 and the plane of the inner wall 85 in the exit portion 55. The inner wall 85 in the entrance portion 50 being cylindrically shaped with the lower portion parallel to the centerline of the entrance portion 50. The angle ($\beta$) may also be defined as the angle established between a line along the surface of the inner wall 85 in the exit portion 55 and the centerline of entrance portion 50 (entrance portion centerline). An angle ($\beta$) of about 15 degrees is preferred.

Figure 5A:
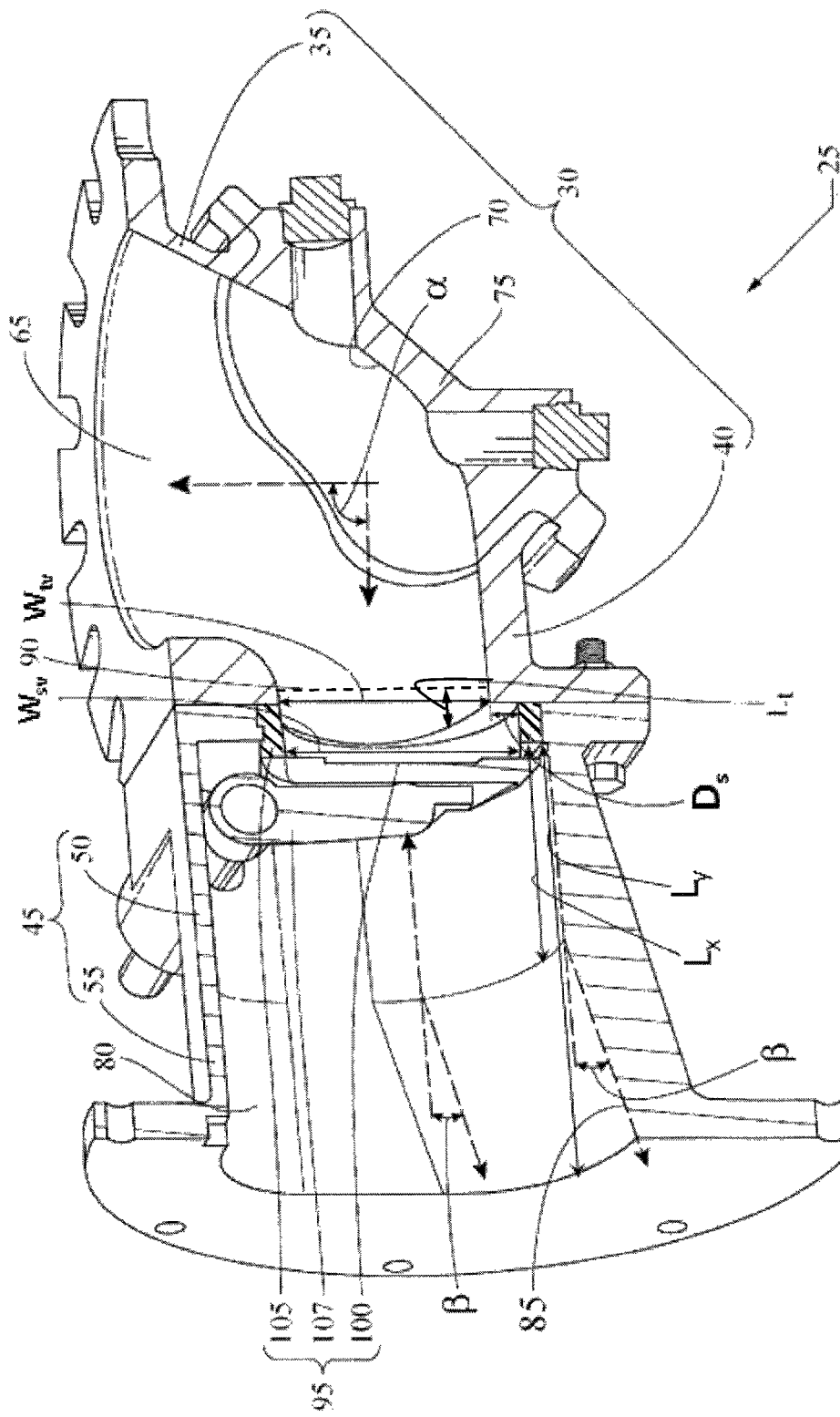
FIG. 5A is a cross-sectional view of the valve body and gate housing in the valve assembly of FIG. 3 from another perspective.

Referring now to FIG. 5A, the inner wall 85 of the second passageway 80 in the gate housing 45 may also be described as having an overall length, $L_y$, with the slant in the inner wall 85 occurring between the entrance portion 50 and the exit portion 55. The entrance portion 50 may further be defined as having a predetermined length, $L_x$, which is the length of the cylindrically shaped inner wall 85 in the entrance portion 50 located between an annular seat 105 and the beginning of the slant in the inner wall 85 in the exit portion 55 of the gate housing 45. The length, $L_x$, may range according to the relationship shown in Equation 1.

$$0.2(L_y) \leq L_x \leq 0.7(L_y) \qquad \text{Eq. 1}$$

Figure 4:
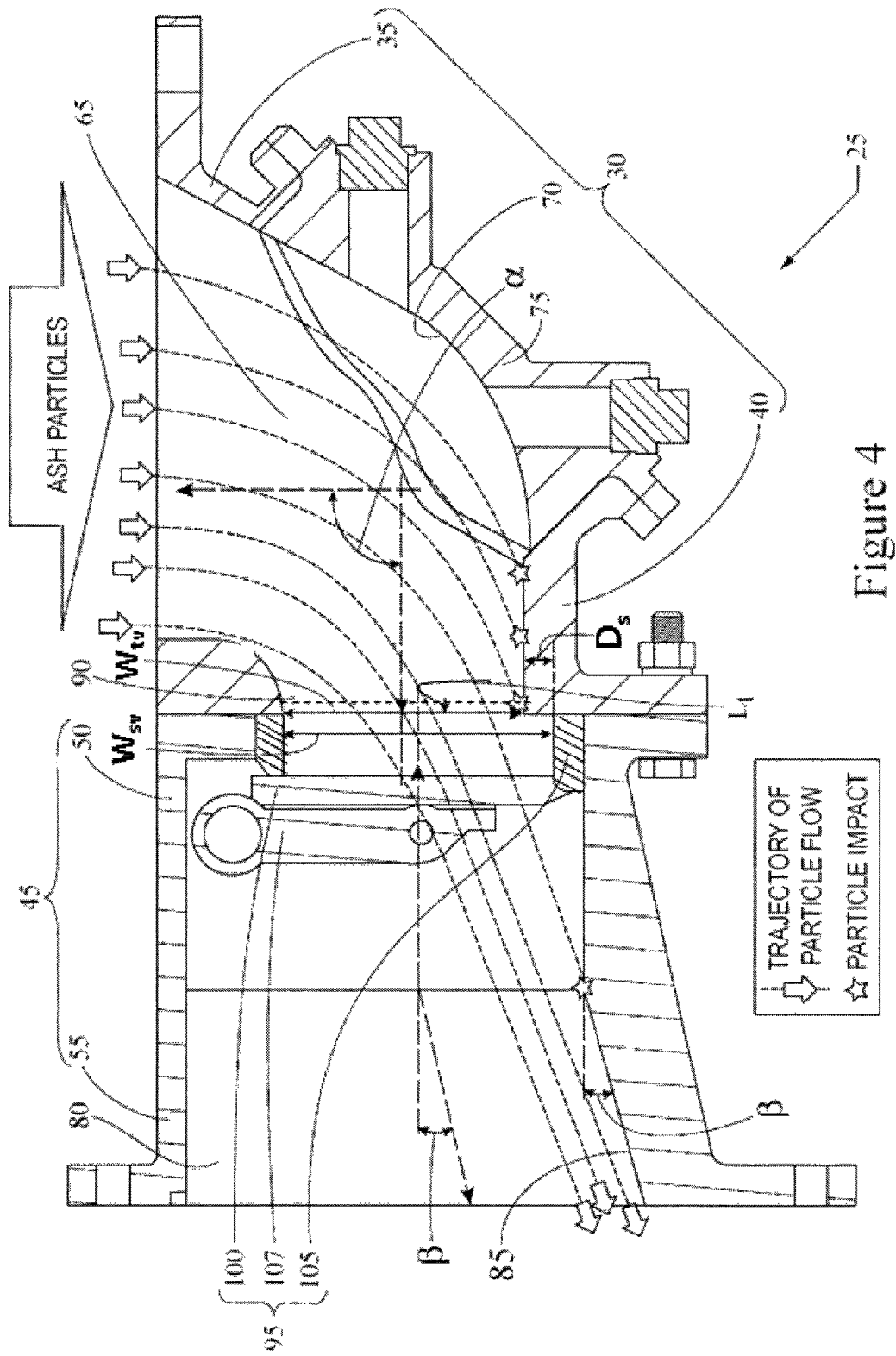
FIG. 4 is a cross-sectional view of the valve body and gate housing in the valve assembly of FIG. 3.

Continuing to refer to FIGS. 4 and 5A, a gate assembly 95 is located proximate to the entrance portion 50 of the gate housing 35 having an open position and a closed position. The gate assembly 95 includes a gate 100 that is sized to occlude the second passageway 80 and a stationary annular seat 105. The annular seat 105 is adapted to contact and mate with the surface of the gate 100. The gate assembly 95 is considered to be closed when the gate 100 contacts and mates with the seat 105 around its perimeter. The gate assembly 95 may be considered to be open when the gate 100 is not in full contact with the perimeter of the seat 105. The gate assembly 95 further includes a gate arm 107 that is in communication with an actuator means 60 (shown best in FIG. 3) that can move the gate 100 to cause the gate assembly 95 to reversibly transition between its open and closed positions. The actuator 60 is preferably designed such that the components that comprise the actuator can be mounted on either side of the valve as desired as space requires.

The valve 25 is optimized to reduce the occurrence of erosive wear resulting from contact with the flow of abrasive particles. In particular, the seat 105 as shown in FIGS. 4 and 5A is positioned to be non-concentric and/or oversized in relation to the outlet section 40 of the valve body 30 such that its surface is at least partially hidden from the predetermined path for the flow of ash particles in order to reduce erosive wear incurred by the seat 105 and to maintain the ability of the seat 105 to form a leak-free seal with the gate 100. In addition, the angle (α) defining the inner surface 70 of the first passageway 65 and the angle (β) defining the inner wall 85 of the second passageway 80 are predetermined in order to reduce erosive wear caused by the flow of abrasive particles. As shown in FIG. 4, the trajectory of particles are predicted to impact or make contact with the inner surface 70 in the outlet section 40 of the valve body 30 and with the surface of the inner wall 85 in the gate housing 45.

Figure 5B:
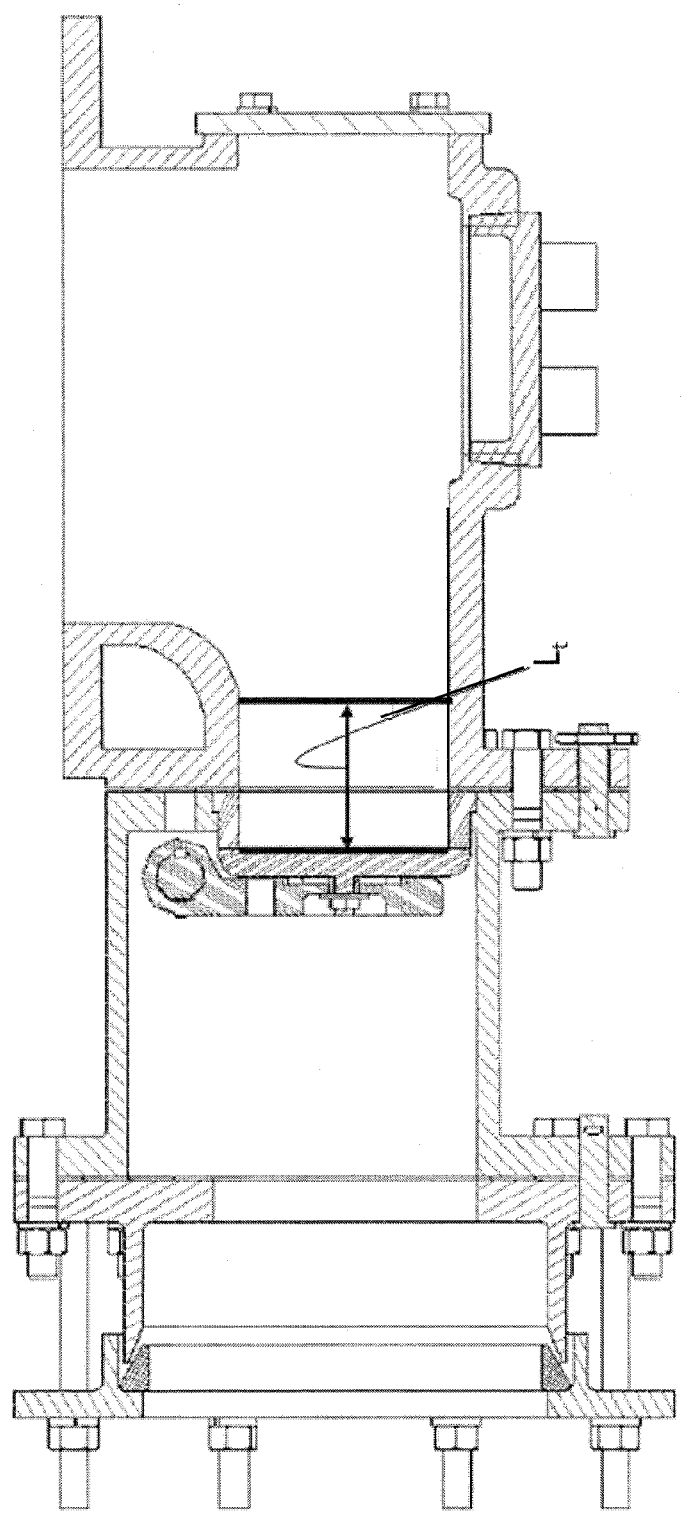
FIG. 5B is a cross-sectional view of a conventional valve body and gate housing highlighting the definition of throat length ($L_t$)

A valve 25 configured according to the teachings of the present disclosure overcomes multiple deficiencies and issues associated with conventional valves when used to laterally load the main pressure/vacuum line in a fly ash transportation system. Conventional valves used in this manner generally suffer from excessive erosive wear induced by the impact of ash particles in multiple locations. A valve may further comprise a throat area near the outlet of the valve body that can induce a high velocity in the flowing ash particles and act as an acceleration zone. As shown in FIG. 5B, the throat area is defined by a length (Lt) that represents the length of the smallest diameter area extending through the outlet of the valve body with possible extension up to the gate. The inner surface of this outlet throat area is one major area of the valve that is subjected to excessive wear due to the impact of abrasive ash particles. The amount of wear that occurs on the inner surface of the outlet throat may be reduced by the use of an optional wear resistant insert. However, this insert, which is made usually from tungsten carbide or a ceramic material, is an expensive option.

A valve body 30 configured according to the teachings of the present disclosure as shown in FIGS. 4 and 5A reduces the wear incurred by the inner surface of this throat area 90 by reducing the velocity of the ash particles and by reducing the size of the acceleration zone. This is accomplished by ensuring that the cross-sectional width ($W_{tv}$) and a length ($L_t$) of the throat area 90 is defined by the relationship provided in Equation 2. A width ($W_{tv}$) of the throat area 90 that is greater than about 3.75 inches (i.e., limits the velocity of the ash particles) and a length ($L_t$) of the throat area that is less than about 1 inch (i.e., limits the acceleration zone) would be preferable.

$$0 \leq L_t \leq 0.3(W_{tv}) \quad \text{Eq. 2}$$

The annular seat against which a closure mechanism seals is another area in a conventional valve that can incur wear due to the impact of flowing ash particles. In a conventional valve, the seat is usually coincident with the inner surface of the valve. This location allows the seat to be exposed to impact and erosion by flowing ash particles.

Figure 6:
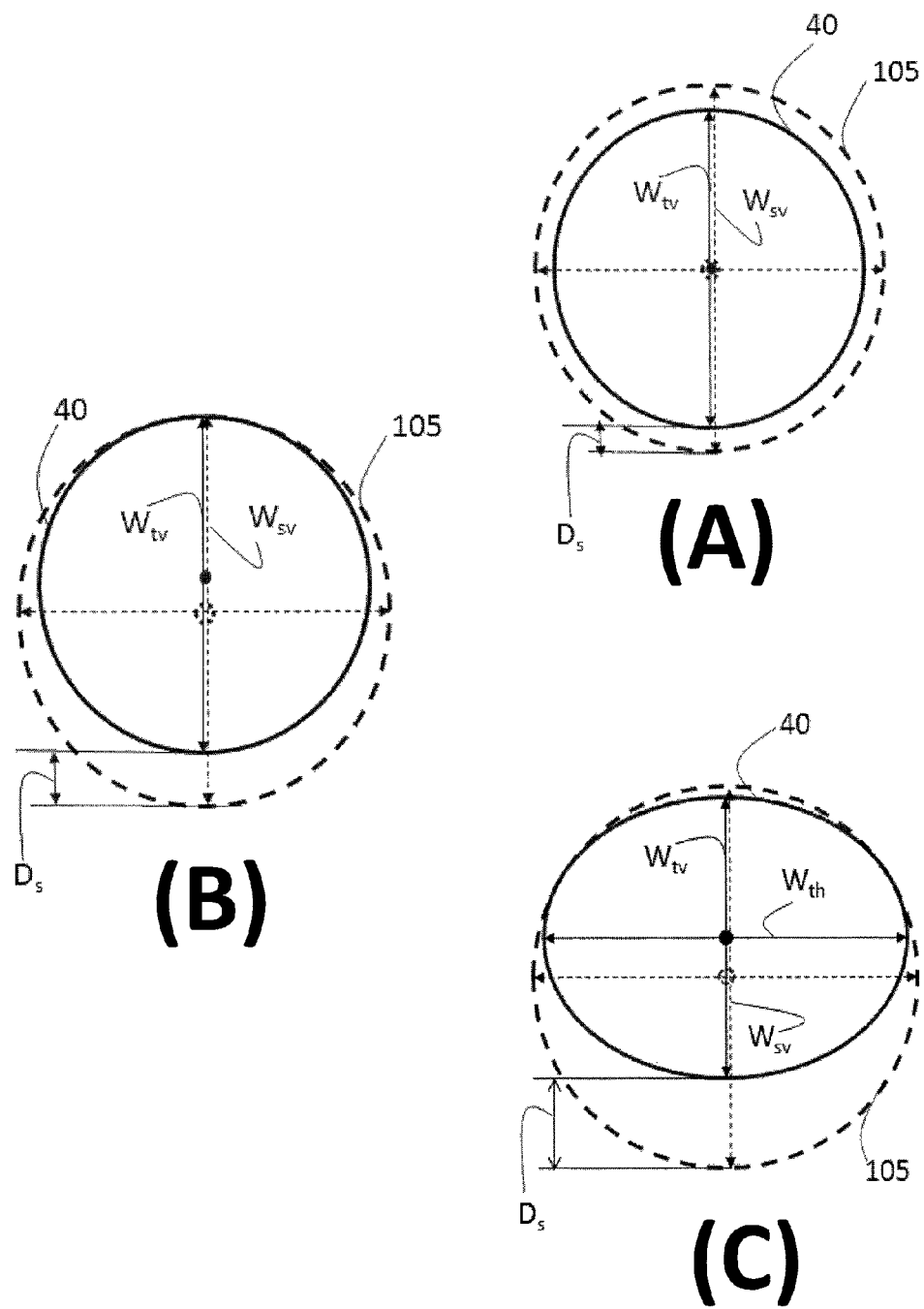
FIG. 6 is a schematic representation of the alignment between the orifice of the first passageway in the outlet portion of the valve body and the inner surface of the oversized annular seat where (A) the annular seat is concentrically aligned with the orifice of the first passageway; (B) the annular seat is non-concentrically aligned with the orifice of the first passageway; or (C) the orifice of the first passageway and the annular seat are non-circular in geometry.

A gate housing 45 configured according to the teachings of the present disclosure as shown in FIGS. 4 and 5A reduces the wear incurred by the annular seat 105. Reducing the wear of the annular seat 105 enhances the ability of the seat 105 to form a leak-free seal with the gate 100, thereby, extending the overall life-time of the valve. Referring now to FIGS. 6A and 6B, a reduction in the wear incurred by the annular seat 105 is accomplished by enlarging the width ($W_{sv}$) of the orifice defined by the inner surface of the annular seat 105 and by positioning the seat 105 to be either concentric (FIG. 6A) or non-concentric (FIG. 6B) with the orifice of the throat area 90 in the outlet section 40 of the valve body 30. In each case, the lower portion of the surface of the seat 105 is located below the inner surface 70 of the valve body 30 by a predetermined distance ($D_s$) in order to hide the seat from the flow path of the ash particles. In other words, the width of the orifice in the throat area ($W_{tv}$) is less than the width ($W_{sv}$) of the orifice that defines the inner surface of the annular seat 105. The predetermined distance ($D_s$) between the inner surface 70 of the valve body 30 and the lower surface of the seat 105 may range according to the relationship shown in Equation 3. Preferably, the distance, $D_s$, is greater than about 400 mils (0.4") with about 500 mils (0.5") being desirable for many applications.

$$0 < D_s \leq 0.25(W_{tv}) \quad \text{Eq. 3}$$

One skilled-in-the-art will understand that the orifice of the throat area 90 or the orifice of the annular seat 105 may deviate from being circular in geometry without exceeding the scope of the current specification. In other words, the orifice of the throat area 90 or the orifice of the annular seat 105 may take the shape of any non-circular geometry, including but not limited to, an ellipse, a polygon, or any combination thereof. For example, in FIG. 6C, one example is shown in which the orifice of the throat area 90 is elliptical in shape. A non-circular shape typically will include both a horizontal and a vertical dimension for the width. As shown in FIG. 6C, the width of the elliptical throat area 90 is provided with both the vertical width dimension ($W_{tv}$) and the horizontal width dimension ($W_{th}$) shown. Since the annular seat 105 in FIG. 6C is circular, the vertical ($W_{sv}$) and horizontal width (not shown) dimensions are identical. One skilled-in-the-art will understand that in determining the distance, $D_s$, it is vertical width dimension for the throat area ($W_{tv}$) and the annular seat ($W_{sv}$) that is used. One further will understand that the annular seat 105 with respect to a non-circular orifice refers to the seat 105 forming a ring around the periphery of the orifice and that the gate 100 in the gate assembly 95 includes a surface adapted to contact and mate with the seat 105.

The oversized width of the seat orifice ($W_{sv}$) and non-concentric positioning of the seat 105 both allow the ash particles to overshoot the seat 105, thereby, avoiding impact and reducing the erosion of the seat 105. Hiding the seat 105 in this manner allows substantial wear to occur on the inner surface 70 of the valve body 30 before affecting the life-time of the annular seat 105. For example, when the distance ($D_s$) between the inner surface 70 of the valve body 30 and the surface of the seat 105 is 500 mil, then the inner surface 70 of the valve body 30 can erode by 500 mil during operation of the valve assembly 25 prior to any substantial erosion of the seat 105 occurring. In this example, the increased life-time of the valve assembly 25 is expected to be on the order of about 2500 hours of operation in extremely erosive conditions, which equates to about a 7 year typical service life. The 2500 hour increased life-time is determined by dividing the distance, $D_s$ (e.g., 500 mil), by the average erosion rate of 0.2 mil per hour that has been measured after operation of valves under extremely erosive conditions in fly-ash transport systems.

Finally, in a conventional valve the inner surface of the valve before and after the closure mechanism is usually either within the same geometric plane or the inner surface after the closure mechanism is slightly inclined or raised above the inner surface of the valve preceding the closure mechanism. Thus the inner surface of a conventional valve located immediately after the closure mechanism is another area that is subject to multiple impacts from flowing ash particles giving rise to excessive erosive wear.

A gate housing 45 configured according to the teachings of the present disclosure as shown in FIGS. 4 and 5, reduces the wear incurred by the inner wall 85 located after the gate assembly 95 from the impact of ash particles. This is accomplished by designing the gate housing 45 to cause the ash particles to overshoot the initial portion of the inner wall 85 and to impact the slanted or declined portion of the inner wall 85 between angle (β) and the exit portion 55. The erosive damage caused by the impact of ash particles is reduced due to a lower angle of the impact incurred by this declined surface.

Figure 7:
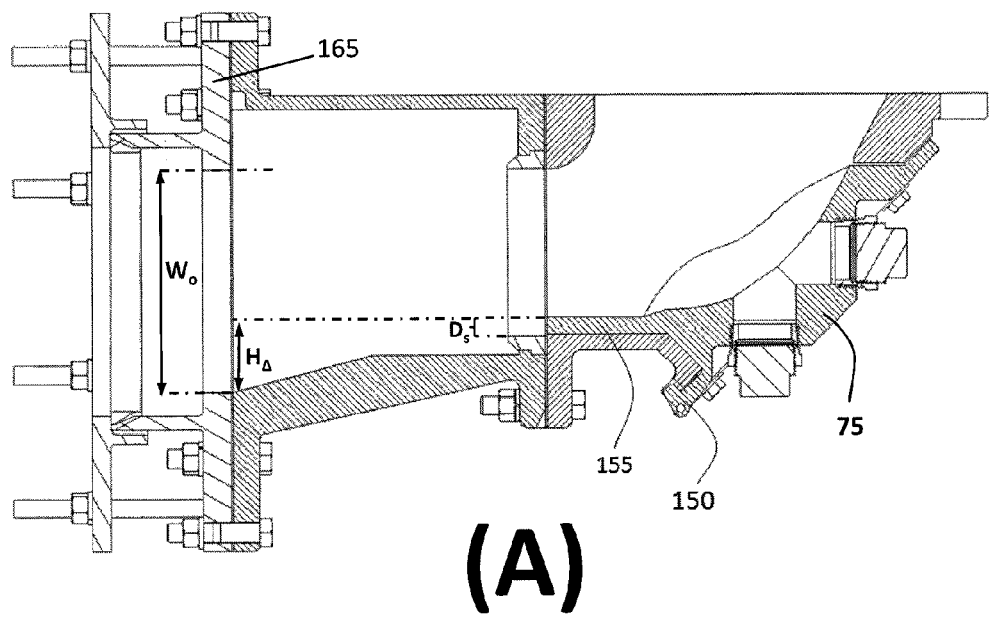
FIG. 7 is a cross-section view of the valve body and gate housing in the valve assembly of FIG. 3, where a wear insert that forms a portion of the inner wall of the throat area is (A) integrally formed with the access cover and (B) a separate piece that is positioned and held in place by the access cover.
Figure 7:
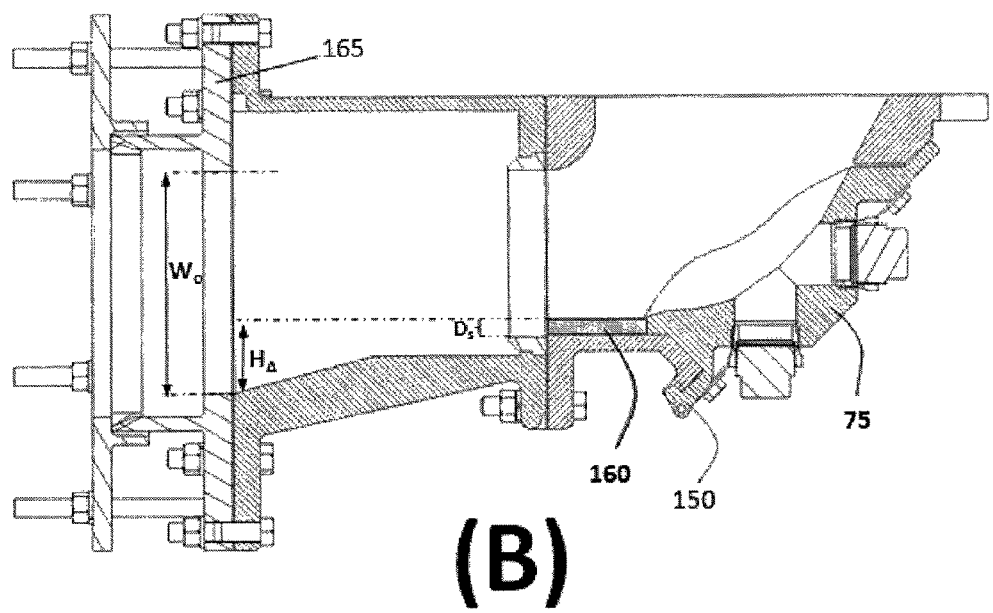

Referring now to FIGS. 7A and 7B, a height differential ($H_A$) between the lower inner surface 70 of the throat area 90 in the outlet section 40 of the valve body 30 and the lower surface of the inner wall in the exit portion 55 of the gate housing 45 is defined. This height differential ($H_A$) incorporates the effects of reducing the occurrence of wear in the valve 25 by lowering the surface of the seat 105 by the predetermined distance ($D_s$) below the inner surface 70 of the valve body 30 (i.e., hide the seat from the flow path of the abrasive particles) and by slanting the inner wall in the exit portion 55 of the gate housing 95 (i.e., reduce the angle of impact incurred from the abrasive particles). The height differential, $H_A$, follows the relationship provided in Equation 4, where $W_o$ represents the width of the opening in the outlet adapter 165 that is used to couple the exit portion 55 of the gate housing 45 to the conveying line 27.

$$0 < H_A \leq 0.5(W_o) \qquad \text{Eq. 4}$$

The value of the height differential, $H_A$, may be predetermined such that a relationship between $H_A$ and $D_s$ exists. This relationship between the height differential, $H_A$, and $D_s$ may be optimized so that the life expectancy of both the seat 105 and the inner wall of the gate housing 85 are approximately equivalent. Preferably, the relationship between $H_A$ and $D_s$ follows the relationship provided in Equation 5.

$$D_s \approx 0.25(H_A) \qquad \text{Eq. 5}$$

In addition to erosive wear, conventional valves also suffer from reduced efficiency due to the unwanted accumulation of ash particles within the confines of the valve. The inner surface of a conventional valve may change directions via angles of 90 degrees or less between the inlet and outlet of the valve. The end result of these sharp angles is the creation of accumulation spaces that experience a reduced or limited level of flow and in which ash particles can collect and compact. The accumulation of ash particles in such spaces causes a loss in productivity due to the downtime associated with the periodic maintenance necessary to remove the compacted or accumulated ash deposit from the valve.

A valve body 30 constructed according to the teachings of the present disclosure as shown again in FIGS. 4 and 5, reduces the amount of ash particles collected and compacted within the valve body 30. This is accomplished by allowing the inner surface 70 of the valve body 30 to be curved at an angle (α) that is at least 90 degrees. The angle (α) being defined as the intersection between the center line of the orifice established by the inlet section 35 and the center line of the orifice established by the outlet section 40 of the valve body 30. The resulting curved inner surface 70 of the valve body 30 is streamlined to reduce the occurrence of particle packing, thereby, minimizing the need to access the second channel through a clean-out port in the access cover 75.

According to one aspect of the present disclosure, the inlet section 35 of the valve body 30 has an orifice with a diameter in the range of about 8 to 12 inches. The exit portion 55 of the gate housing 45 has an orifice with a diameter in the range of about 4 to 6 inches, including the use of any desired adapter 165, such as that shown in FIG. 7. The inlet section 35 of the valve body 30 and the exit portion 55 of the gate housing 45 connect to an outlet 20 of a hopper 15 having a similar diameter of about 8 to 12 inches and to a conveying line 27 or pipeline with a similar 4 to 6 inch diameter, respectively. The change of flow direction within the valve body as defined by angle (α) assists in regulating the ash flow and in preventing the flooding of the conveying line 27.

According to another aspect of the present disclosure, the access cover 75 may optionally include a wear insert 155 that is integrally formed as part of the access cover 75 (FIG. 7A) or a wear insert 160 that constitutes a separate component (FIG. 7B). The wear inserts 155, 160 may be used as a sacrificial component to incur wear from impacting abrasive particles during the operation of the valve. In this regard, the wear insert 155, 160 becomes part of the inner surface 70 of the throat area 90 of the valve body 30. Upon the occurrence of wear in the throat area 90, the wear inserts 155, 160 may be replaced with another wear insert 155, 160. The access cover 75 may further comprise a hinged surface 150 to allow the access cover 75 the ability to pivot and to position the wear insert 155 as part of the inner surface 70 of the throat area 90. When the wear insert 160 is a separate component, the insert 160 may be held or locked in place as part of the inner surface 70 of the throat area 90 by any means known to one skilled-in-the-art, including but not limited to, the positioning of the access cover 75, a groove & tongue configuration, a wedge joint, and a stop located at the perimeter of the outlet section 40, or the like. According to another aspect of the present disclosure, the valve 25 is designed with a movable gate assembly 95 mounted in the gate housing 45 that includes a gate 100 to ensure both proper gate 100 to seat 105 alignment and positive sealing. The gate assembly 95 may be any type of gate known to one skilled-in-the-art, including, but not limited to a flapper style gate assembly capable of sealing against a minimum of about a 20 foot column of accumulated ash in the hopper 15 in addition to the pressure differential used to convey the ash. The gate assembly 95 may be made of stainless steel, tungsten carbide or any other metal or metal alloy used in the industry. The surface of the gate 100 may optionally include a wear resistant coating, such as an ion nitride material, a ceramic material, or tungsten carbide, among others. The gate 100 may be operated to move between its open and closed positions using any type of actuation means 60, including but not limited to a pneumatic air cylinder. In case of pneumatic failure, a check valve in the supply line can maintain the air pressure necessary to provide a tight seal between the gate 100 and the seat 105.

The valve body 30 may be coupled to the outlet 20 of the hopper 15 and to the gate housing 45 and the gate housing 45 may be coupled to the valve body 30 and the conveying line 27 by any type of coupling known to one skilled-in-the-art including, but not limited to a universal bolt-flange design. Each of the couplings is preferably designed to provide for both easy assembly and disassembly of the valve 25 from the ash transportation system 10. For example, the coupling between the gate housing 45 to the valve body 30 allows for the valve body 30 to be disconnected from the gate housing 45 in order to provide for maintenance of the gate assembly 95 including the annular seat 105.

According to another embodiment of the present disclosure a particle transportation system 10 for collecting and controlling the flow of abrasive particles between a particle collector, such as an electrostatic precipitator, a bag house, or an economizer, among others, and a disposal unit or compounding vessel is provided. For example, a fly ash transportation system 10 generally comprises at least one hopper 15 having an inlet (not shown) and an outlet 20; at least one conveying line 27; a valve 25 designed and constructed according to the previously described parameters; and a pressure or vacuum source. The inlet of the hopper 15 is in communication with the ash collector for receiving the ash particles, while the conveying line 27 is in communication with the disposal unit for delivery of the ash particles. The valve 25 has a valve body 30 and a gate housing 45 for controlling the flow of the ash particles between the hopper 15 and the conveying line 27. The valve body 30 is coupled to the outlet 20 of the hopper 15. Likewise, the gate housing 45 is coupled to the conveying line 27. The pressure and/or vacuum source causes the ash particles to flow from the ash collector to the disposal unit.

Another objective of the present disclosure is to provide a method of constructing a valve for controlling the flow of ash particles in a fly ash collection or transportation system. The valve 25 used in this fly ash transportation system 10 is the valve 25 described above having a valve body 30, a gate housing 45, and a gate assembly 95 for opening and closing the valve 25. The valve body 30 and gate housing 45 are optimized to reduce the occurrence of erosive wear resulting from contact with the flow of ash particles between the hopper 15 and conveying line 27 in the transportation system 10.

Figure 8:
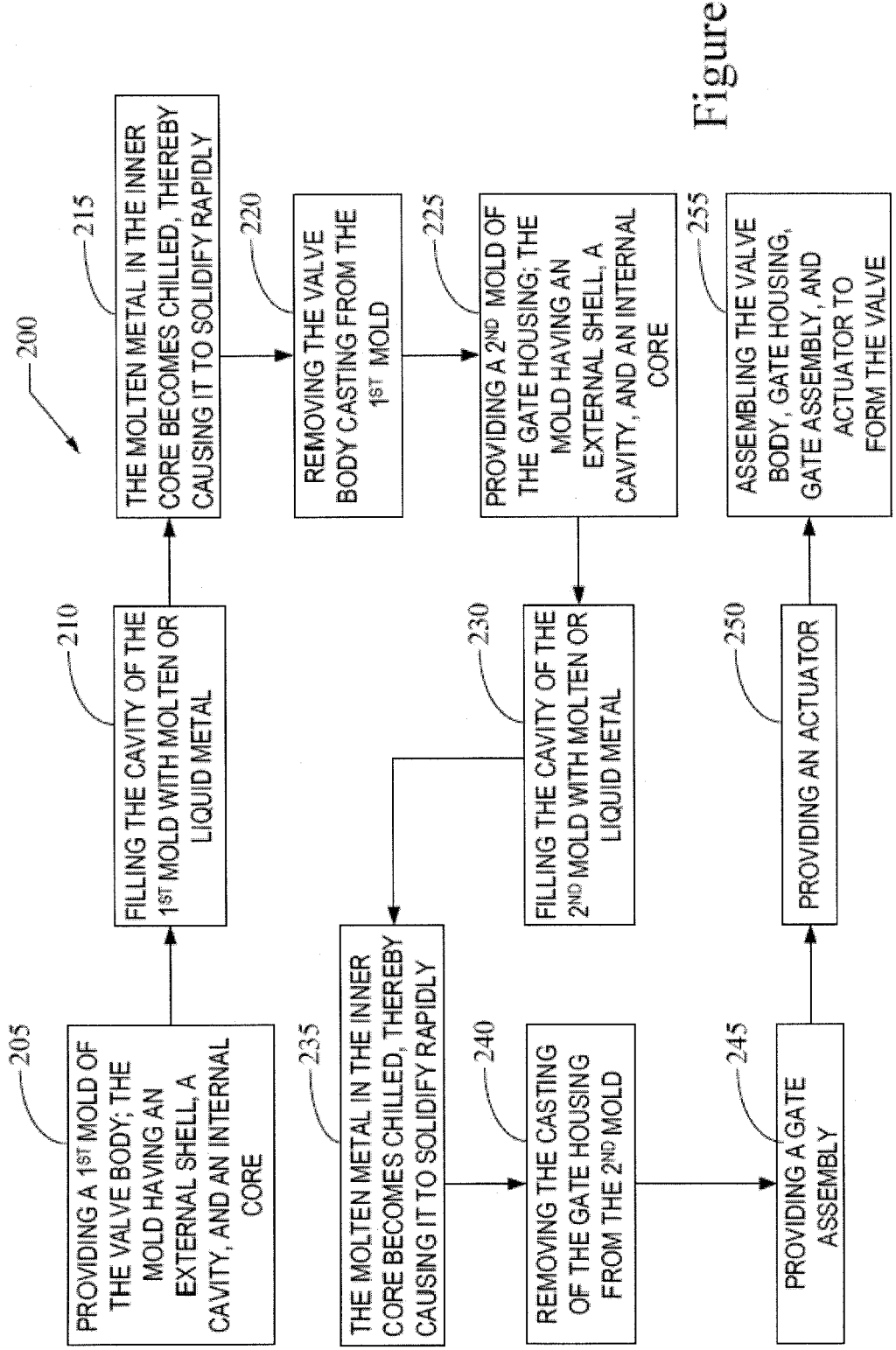
FIG. 8 is a schematic representation of method of making a valve according to another embodiment of the present disclosure.

Referring to FIG. 8, this method 200 generally comprises multiple steps, the first of which is providing a first mold 205 of the valve body, which includes an external shell, a cavity, and an internal core. The cavity of the first mold is then filled 210 with a molten or liquid metal. The internal core of the first mold is designed to chill the molten metal in the section of the mold that represents the inner surface of the throat area of the valve body causing it to cool faster than the rest of the molten metal in the cavity. The molten metal in the internal core is thus chilled 215 and the casting of the valve body removed 220 from the mold.

These same steps are then repeated for the formation of the gate housing. These steps generally include providing a second mold 225 of the gate housing having an external shell, a cavity, and an internal core. The cavity of the second mold is then filled 230 with a molten metal. The internal core of the second mold is designed to chill the molten metal in the section of the mold that represents the lower wall including the slanted inner wall of the gate housing causing it to cool faster than the rest of the molten metal in the cavity. The molten metal in the internal core of the mold is chilled 235 and the casting of the gate housing is then removed 240 from the second mold.

The method 200 further comprises the steps of providing a gate 245 having an open position and a closed position and providing an actuator 250. The method 200 further comprises the step of assembling the valve body, gate housing, gate assembly, and actuator 255 to form the valve.

The solidification of the molten metal in the method 200 described above occurs through a combination of nucleation and crystal growth. The core used in the method 200 is designed to act as a heat sink capable of chilling the molten metal. The faster cooling rate for the molten metal in the vicinity of the core promotes the formation and growth of hard metal carbide grains. Thus metal carbide grains are formed as part of the inner surface 70 in the throat area 90 of the valve body 30 and as part of the lower inner wall 85 of the gate housing 45. These metal carbides are imbedded in a metal matrix that has a different microstructure than the carbides. This metal matrix may exhibit a hardness that is between about 3 to 5 times softer than the carbide grains. The hard metal carbide grains may be approximately the same size as the ash particles. The size and volume fraction of the metal carbide grains formed during the chilling steps 215, 235 is intended to be such that there is a high probability that the ash particles will impact the hard carbide grains rather than the softer surrounding matrix. Thus, the presence of these hard metal carbides can reduce the occurrence of erosive wear resulting from contact with or impact by the ash particles.

The chilling steps 215, 235 are performed on localized areas that are subject to high wear in the valve body 30. The chilling steps 215, 235 are restricted to these localized areas because one material design constraint for the valve 25 requires that the castings remain soft enough to allow for subsequent optional machining when it is deemed necessary or desirable. The localization of the chilling hardens the areas in the valve body 30 and gate housing 45 that are vulnerable to excessive erosive wear, while permitting the optional machining of other areas in the valve body 30 and/or gate housing 45.

Preferably, the molten or liquid metal used in the method 200 of making the valve is iron. Thus the carbides formed during the chilling steps 215, 235 will be iron carbides. However, a small predetermined amount of chromium metal may be included in the molten iron used during the filling step 205 for the valve body. Chromium may also be included in the molten metal used to form the gate housing 35 when desirable. Chromium will be incorporated into the carbides that form during the chilling steps 215, 235, creating a harder carbide phase. However, since the addition of chromium to the molten iron will harden not only the areas that are chilled, but to a lesser extent in the rest of the casting, the addition of chromium is preferably done only with respect to the casting of the valve body 30, which is very vulnerable to erosion. The addition of chromium to the molten metal used to form the gate housing 45 is done such that the resulting increase in hardness will not inhibit the complex machining necessary to complete the fabrication of the gate housing 45.

A measurement of the hardness exhibited by the valve body 30 and/or gate housing 45 can be used to provide a prediction of wear resistance. In general, the wear resistance will increase with an increase in the hardness of the material being subjected to an abrasive environment. Such a hardness measurement can be done at various locations in the valve body 30 and/or gate housing 45 to determine any change in hardness resulting from the formation of iron carbides or by the addition of a small amount of chromium to the iron metal.

Similar process steps can be used in the preparation of wear inserts 155, 160 for use in the valve body 30 either as a separate component or as part of the access cover 75 without exceeding the scope of the present disclosure. In this case, the hardness of the wear insert 155, 160 may be adapted to provide the desired wear resistance to extend the life of the valve body 30. Upon excessive wear of the wear insert 155, 160, the insert 155, 160 may be replaced with a new insert 155 160 to further extend the life of the valve.

One skilled-in-the-art will understand that the Brinell hardness test (e.g., ASTM E10-08 entitled "*Standard Test Method for Brinell Hardness of Metallic Materials*") may be used to measure the hardness of cast irons. This test generally involves impacting the casting with an indenter and subsequently measuring the size of the resulting impression. The smaller the size of the impression, the harder the casting. The casting associated with a conventional valve was measured to be in the range of about 100 to 200 Brinell. A valve body 30 and gate housing 45 prepared according to the method 200 of the present disclosure was also tested. The hardness of the inner surface 70 in the throat area 90 of the valve body 30 and in the slanted inner wall 85 of the gate housing 45 that underwent the chilling 215, 235 process steps was measured to be on the order of about 400 to 500 Brinell. The other parts of the valve body 30 and gate housing 45 that are not exposed to the chilling 215, 235 process steps will exhibit a hardness similar to the cast iron or steels used in the conventional valve. This 2×-3× increase in hardness resulting from the chilling 215, 235 process steps leads to a substantial increase in wear resistance for the inner surface 70 in the throat area 90 of the valve body 30 and in the slanted inner wall 85 of the gate housing 45.

The following examples are given to illustrate the invention and should not be construed to limit the scope of the invention. One skilled-in-the-art will understand that erosion (E) is a function of the angle at which a particle impacts a material, the velocity at which the particle is traveling, and the hardness of the material's surface upon which the particle collides. Erosion is also known to approximately scale with the velocity (v) of the impinging particles according to the relationship: $E \propto v^{2.5}$. A prediction model for the erosion caused by small particle bombardment can be derived and used to provide normalized erosion damage curves that remove the dependence on velocity. A more thorough description of using such a predictive model to derive normalized erosion damage curves is provided in an article authored by Y. I. Oka, H. Ohnogi, T. Hosokawa and M. Matsumura entitled "*The impact angle dependence of erosion damage caused by solid particle impact*" and published in *Wear*, vol. 203-204 (1997), pgs 573-579; the entire contents of which are hereby incorporated by reference. Further description of a predictive model is provided in two sequential articles authored by Oka, et al. and published in *Wear*, vol. 259 (2005), pgs 95-101 and in *Wear*, vol. 259 (2005), pgs 102-109; the entire contents of which are hereby incorporated by reference.

Figure 9:
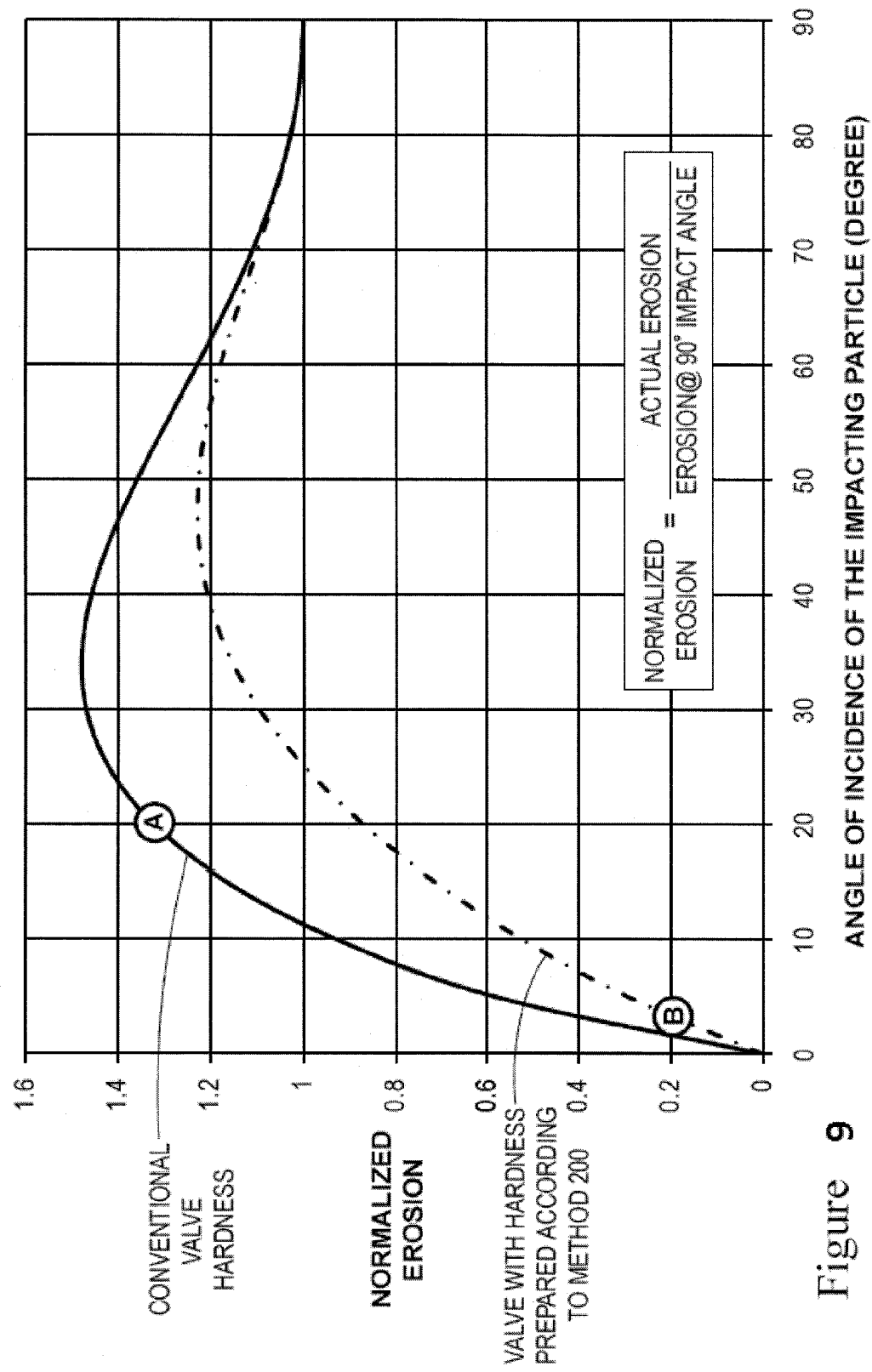
FIG. 9 is a graphical comparison of the normalized erosion of a conventional valve and a valve constructed according to the method of FIG. 8 plotted as a function of the angle of particle impact.

Erosion damage curves were determined using the predictive model of Oka, et al. for a conventional valve and a valve 25, such as that shown in FIGS. 4 and 5, constructed according to the method 200 of the present disclosure as described in FIG. 8. The erosion curves as shown in FIG. 9 represent values for normalized erosion of the valves' internal surfaces plotted as a function of the angle at which the surfaces are impacted by fly ash particles. Normalized erosion is defined as the actual erosion that is incurred by the material under the incident or impact angles during normal operation of the valve divided by the erosion that occurs when the incident or impact angle is 90 degrees and the impact velocity is the same.

As shown in FIG. 9, the normalized erosion expected for a conventional valve is higher than for a valve 25 prepared according to the present disclosure at all angles of impact greater than zero degrees and less than about 75 degrees. If one logically assumes that a harder metallic material is more resistant to the 90 degree impact of flowing particles, these erosion curves demonstrate that the valve 25 of the current disclosure will exhibit a greater degree of wear resistance than a conventional valve. For example, the erosion of the gate housing in a conventional valve having conventional hardness impacted by fly ash particles at an angle of 20 degrees will erode at a 30% higher rate than a surface of the same hardness exposed to the impact of fly ash particles at an angle of 90 degrees (see point A in FIG. 9). In comparison, the gate housing of a valve prepared according to the teachings of the present disclosure with a material hardness generated according to method 200 will erode at a 80% lower rate than a similar surface exposed to the impact of flyash particles at an angle of 90 degrees (see point B in FIG. 9) due to the very low impact angle established by the slanted inner wall 85. For further illustration, if one assumes that the erosion that occurs from the impact of fly ash particles at an angle of 90 degrees is 20% lower for a surface prepared according to method 200 than for a surface in a conventional valve, then the gate housing of the valve prepared according to the teachings of the present disclosure (e.g., method 200) exhibits greater than eight times (8×) the erosion resistance of the conventional valve (e.g., compare point A to point B in FIG. 9).

A person skilled in the art will recognize that the measurements described are standard measurements that can be obtained by a variety of different test methods. The test methods described in the present disclosure represents only one available method to obtain each of the required measurements.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A valve for controlling the flow of abrasive particles along a predetermined path from the outlet of a hopper to a conveying line in a particle collection or transportation system; the valve comprising:

a valve body having an inlet section and an outlet section; the inlet section being adapted to be coupled to the outlet of the hopper; the inlet section and outlet section defining a first passageway between the inlet section and the outlet section through which the abrasive particles can flow, the first passageway having an outlet section centerline and an inlet section centerline forming an angle α of at least 90 degrees and less than 180 degrees between the inlet section centerline and the outlet section centerline;

a gate housing having an entrance portion coupled to the outlet section of the valve body and an exit portion adapted to be coupled to the conveying line; the gate housing defining a second passageway between the entrance portion and the exit portion through which the abrasive particles can flow;

a gate assembly that has an open position and a closed position, the gate assembly including a gate that is sized to occlude the second passageway and an annular seat located proximate to the entrance portion of the gate housing and adapted to contact and mate with the gate; the annular seat having an inner perimeter sized or positioned relative to the outlet section of the valve body such that a portion of the inner perimeter is at least partially hidden from the flow of the abrasive particles when the gate assembly is in the open position; the gate assembly being in the closed position when the gate contacts the seat such that the flow of abrasive particles is occluded; and an actuating means to cause the gate assembly to reversibly move between the open and closed positions.

2. The valve of claim 1, wherein the valve further comprises an access cover having an inner surface with a curvature adapted to the valve body defining the first passageway.

3. The valve of claim 1, wherein the actuating means is a pneumatic actuator; the actuator being shaped in a manner that the actuator is mountable in at least two orientations offset from each other by 180 degrees, allowing the actuator to be mounted on either side of the valve.

4. The valve of claim 1, wherein the outlet section of the valve body further comprises a throat area having a cross-sectional width $W_{tv}$ and a length $L_t$;
wherein the length $L_t$ is within the relationship: $0 \leq L_t \leq 0.3 \cdot W_{tv}$.

5. The valve of claim 4, wherein the cross-sectional width $W_{tv}$ is greater than about 3.75 inches and the length $L_t$ is less than about 1 inch.

6. The valve of claim 1, the second passageway further having an entrance portion centerline the outlet section of the valve body terminating in an outlet port; wherein the outlet section centerline and the entrance portion centerline are offset such that the outlet port is not concentric with the annular seat.

7. The valve of claim 1, wherein at least one of the outlet section of the valve body and the second passageway of the gate housing has a hardened interior area with a hardness that is greater than the hardness of other areas in the first passageway of the valve body or in the second passageway of the gate housing.

8. The valve of claim 7, wherein the hardened interior area has a hardness value greater than about 400 Brinell.

9. The valve of claim 8, wherein the hardened interior area includes hard metal carbide grains.

10. The valve of claim 9, wherein the hard metal carbide grains are selected as being one from the group of iron carbides, chromium carbides, and mixtures thereof.

11. The valve of claim 9, wherein the hard metal carbide grains are embedded in a matrix softer than the hard metal carbide grains.

12. The valve of claim 9, wherein the hard metal carbide grains are approximately the same in size as the abrasive particles.

13. The valve of claim 4, wherein the outlet section of the valve body further comprises a metal or ceramic wear resistant insert; the insert having a hardness value greater than the hardness exhibited by other areas in the outlet section of the valve body.

14. The valve of claim 13, wherein the valve further comprises an access cover having an inner surface with a curvature adapted to the valve body defining the first passageway; the insert being formed integrally as part of the access cover.

15. A valve for controlling the flow of abrasive particles along a predetermined path from the outlet of a hopper to a conveying line in a particle collection or transportation system; the valve comprising:

a valve body having an inlet section and an outlet section; the inlet section being adapted to be coupled to the outlet of the hopper; the inlet section and outlet section defining a first passageway between the inlet section and the outlet section through which the abrasive particles can flow;

a gate housing having an entrance portion coupled to the outlet section of the valve body and an exit portion adapted to be coupled to the conveying line; the gate housing defining a second passageway between the entrance portion and the exit portion through which the abrasive particles can flow;

a gate assembly that has an open position and a closed position, the gate assembly including a gate that is sized to occlude the second passageway and an annular seat located proximate to the entrance portion of the gate housing and adapted to contact and mate with the gate; the annular seat having an inner perimeter sized or positioned relative to the outlet section of the valve body such that a portion of the inner perimeter is at least partially hidden from the flow of the abrasive particles when the gate assembly is in the open position; the gate assembly being in the closed position when the gate contacts the seat such that the flow of abrasive particles is occluded; and an actuating means to cause the gate assembly to reversibly move between the open and closed positions, the second passageway further having an entrance portion centerline; wherein the second passageway of the gate housing is further defined by an inner wall slanted in the exit portion such that an acute angle β is established as measured between a line drawn parallel to the inner wall in the exit portion and the entrance portion centerline extending through the exit portion.

16. The valve of claim 15, wherein the angle β is established in the inner wall at the interface between the entrance portion and the exit portion; the inner wall having an overall length $L_y$, and the entrance portion having a predetermined length $L_x$; wherein the length $L_x$ is within the relationship: $0.2 \cdot L_y \leq L_x \leq 0.7 \cdot L_y$.

17. The valve of claim 15, wherein the angle β is about 15 degrees.

18. The valve of claim 15, wherein the inner wall of the gate housing further comprises a metal or ceramic wear resistant insert; the insert exhibiting a hardness value greater than the hardness exhibited by other areas in the second passageway of the gate housing.

19. A valve for controlling the flow of abrasive particles along a predetermined path from the outlet of a hopper to a conveying line in a particle collection or transportation system; the valve comprising:

a valve body having an inlet section and an outlet section; the inlet section being adapted to be coupled to the outlet of the hopper; the inlet section and outlet section defining a first passageway between the inlet section and the outlet section through which the abrasive particles can flow;

a gate housing having an entrance portion coupled to the outlet section of the valve body and an exit portion adapted to be coupled to the conveying line; the gate housing defining a second passageway between the entrance portion and the exit portion through which the abrasive particles can flow;

a gate assembly that has an open position and a closed position, the gate assembly including a gate that is sized to occlude the second passageway and an annular seat located proximate to the entrance portion of the gate housing and adapted to contact and mate with the gate; the annular seat having an inner perimeter sized or positioned relative to the outlet section of the valve body such that a portion of the inner perimeter is at least partially hidden from the flow of the abrasive particles when the gate assembly is in the open position; the gate assembly being in the closed position when the gate contacts the seat such that the flow of abrasive particles is occluded; and an actuating means to cause the gate assembly to reversibly move between the open and closed positions, wherein the outlet section of the valve body further comprises a throat area having an inner cross-section with a cross-sectional width $W_{tv}$ and the annular seat has an inner width $W_{sv}$; wherein the width $W_{sv}$ is greater than the width $W_{tv}$.

20. The valve of claim 19, wherein the annular seat and the throat area both have a circular cross-section or both have a non-circular cross-section.

21. The valve of claim 19, wherein the annular seat is positioned non-concentrically with respect to the orifice in the throat area of the outlet section of the valve body.

22. The valve of claim 21, wherein the positioning of the inner surface of the annular seat with respect to the orifice in the throat area is further defined by a predetermined distance $D_s$; wherein the distance $D_s$ is within the relationship: $0<D_s\leq 0.25\cdot W_{tv}$.

23. The valve of claim 22, wherein the distance $D_s$ between the inner surface of the annular seat and the orifice in the throat area of the outlet section is at least about 400 mils.

24. The valve of claim 22, wherein the valve further comprises an outlet adapter.

25. The valve of claim 24, wherein the outlet adaptor has an outlet adapter width $W_o$ and the exit portion of the gate housing further comprises an exit port with a lower surface extending lower than the inner cross-section of the throat area by a height differential $H_A$; the height differential $H_A$ and the outlet adaptor width $W_o$ following the relationship: $0<H_A\leq 0.5\cdot W_o$.

26. The valve of claim 25, wherein the height differential $H_A$ and the distance $D_s$ follows the relationship: $D_s\approx 0.25\cdot H_A$.

27. A particle transportation system for collecting and controlling the flow of abrasive particles between a particle collector and a disposal unit or compounding vessel; the particle transportation system comprising:

at least one hopper to collect the abrasive particles having an inlet and an outlet; the inlet being in communication with the particle collector for receiving the abrasive particles;

at least one conveying line; the conveying line being in communication with the disposal unit or compounding vessel for delivery of the abrasive particles;

a valve for controlling the flow of the abrasive particles between the hopper and the conveying line; the valve including, a valve body having an inlet section coupled to the outlet of the hopper and an outlet section, the inlet section and outlet section defining a first passageway between the inlet section and the outlet section, the first passageway further having an outlet section centerline and an inlet section centerline forming an angle α of at least 90 degrees and less than 180 degrees between the inlet section centerline and the outlet section centerline, a gate housing having an entrance portion coupled to the outlet section of the valve body and an exit portion coupled to the conveying line, the entrance portion and the exit portion defining a second passageway having an inner wall, a gate assembly having an open position and a closed position, the gate assembly including a gate that is sized to occlude the second passageway, and an annular seat located adjacent to the entrance portion of the gate housing and adapted to contact and mate with the gate; the annular seat having an inner perimeter and being sized or positioned relative to the outlet section of the valve body such that a portion of the inner perimeter is at least partially hidden from the flow of abrasive particles when the gate assembly is in the open position, the gate assembly being in the closed position when the gate contacts the seat such that the flow of abrasive particles is occluded, the second passageway having an entrance portion centerline; the inner wall of the second passageway being slanted in the exit portion such that an acute angle β is established as measured between a line drawn parallel to the inner wall in the exit portion and the entrance portion centerline extending into the exit portion, and an actuating means to cause the gate assembly to reversibly move between the open and closed positions; and at least one selected from the group of a pressure source, a vacuum source, and a combination of both a pressure source and a vacuum source for causing the abrasive particles to flow from the particle collector to the disposal unit or compounding vessel.

28. The particle transportation system of claim 27, wherein the outlet section in the valve body is further defined by an outlet port having a width $W_{tv}$ and the annular seat has a predetermined distance $D_s$ from the outlet port; wherein the distance $D_s$ is within the relationship: $0<Ds0.25\ W_{tv}$.

29. The particle transportation system of claim 27, wherein the inner wall has an overall length $L_y$ and the entrance portion having a predetermined length $L_x$, wherein the length $L_x$ is within the relationship: $0.2\cdot L_y\leq L_x\leq 0.7\cdot L_y$.

30. The particle transportation system of claim 27, wherein the angle β is about 15 degrees.

31. The particle transportation system of claim 27, the first passageway further having an outlet section centerline and an inlet section centerline forming an angle α of at least 90 degrees and less than 180 degrees between the inlet section centerline and the outlet section centerline.

32. The particle transportation system of claim 27, wherein the abrasive particles are caused to flow from the particle collector to the disposal unit or compounding vessel through the use of a vacuum source.

33. The particle transportation system of claim 27, wherein the abrasive particles comprise at least one selected from the group of fly ash, concrete, cement, aluminum oxide, calcium carbonate, ceramic dusts, clays, flour, foundry sand, magnesium oxide, metallic salts, silica, soda ash, talc, titanium dioxide, and zinc oxide.

\* \* \* \* \*